(12) United States Patent
Castillo Castillo et al.

(10) Patent No.: US 9,410,224 B2
(45) Date of Patent: Aug. 9, 2016

(54) PRE-TREATMENT FOR CONVENTIONAL CYANIDATION FOR SILVER RECOVERING FROM MANGANESE-ARGENTIFEROUS ORES CONTAINING OCCLUDED SILVER

(71) Applicant: Centro de Investigacion en Materiales Avanzados, S.C., Chihuahua (MX)

(72) Inventors: Pedro Castillo Castillo, Chihuahua (MX); Erasmo Orrantia Borunda, Chihuahua (MX)

(73) Assignee: Centro de Investigacion en Materiales Avanzados, S.C., Chihuahua (MX)

( * ) Notice: Subject to any disclaimer, the term of this patent is extended or adjusted under 35 U.S.C. 154(b) by 72 days.

(21) Appl. No.: 14/242,199

(22) Filed: Apr. 1, 2014

(65) Prior Publication Data
US 2015/0275329 A1    Oct. 1, 2015

(30) Foreign Application Priority Data

Dec. 18, 2013    (MX) .................... MX/a/2013/015102

(51) Int. Cl.
*C22B 11/00*    (2006.01)
*C22B 3/00*    (2006.01)
*C22B 11/08*    (2006.01)
*C22B 47/00*    (2006.01)

(52) U.S. Cl.
CPC .................. *C22B 11/04* (2013.01); *C22B 11/08* (2013.01); *C22B 47/00* (2013.01)

(58) Field of Classification Search
None
See application file for complete search history.

(56) References Cited

FOREIGN PATENT DOCUMENTS

GB    380653    *    9/1932

* cited by examiner

*Primary Examiner* — Steven Bos
(74) *Attorney, Agent, or Firm* — Defillo & Associates, Inc.; Evelyn A. Defilló

(57) ABSTRACT

The present invention discloses a treatment for recovering silver from ores containing occluded silver, predominantly pyrolusite, which includes a pre-treatment of the manganese-argentiferous ore with sulfur dioxide produced by roasting elemental sulfur, generating manganese sulphate, and pregnant solution with more than 90% silver recovery.

2 Claims, 4 Drawing Sheets

PRE-TREATMENT FOR CONVENTIONAL CYANIDATION FOR SILVER RECOVERING FROM MANGANESE-ARGENTIFEROUS ORES CONTAINING OCCLUDED SILVER

OBJECT OF THE INVENTION

The present invention discloses a treatment for recovering silver from ores containing occluded silver, predominantly pyrolusite, which includes a pre-treatment of the manganese-argentiferous ore with sulfur dioxide produced by roasting elemental sulfur, generating manganese sulphate, and pregnant solution with more than 90% silver recovery.

BACKGROUND

Current methods for retrieving silver from manganese (Mn) ores with occluded silver (Ag) do not produce adequate yields. In the best of the cases, current methods reach 30% recovery yield, as when direct cyanidation is used, and those who reach it require complicated and expensive processes where the silver must be found in high concentrations in order to reach an acceptable yield. Currently, little progress or developments exist. The main objective of these processes is to release the occluded silver, either by grinding, which may be unaffordable, or by chemical methods.

Acanthite ($Ag_2S$) is considered to be the main ore source of silver and pyrolusite ($MnO_2$) is considered to be the main ore source of manganese, from their association a manganese-argentiferous ore is produced.

Currently, it can be found, on scientific literature and patent documents, methods for recovering manganese using methods such as roasting and leaching. Zhang and Yong Cheng (Zhang, W., Cheng, Ch Y, 2007, Manganese Metallurgy Review Part I: Leaching of ores/secondary materials and recovery of electrolytic/chemical manganese dioxide. Hydrometallurgy 89:137-159), review of such processes, where the ore to be recovered is MN, in view of its use on batteries.

In the case of the roasting, a pyro-metallurgical pretreatment including melting (Cooper, H. S., Schaefer, J. C., Schmidt, E. C., 1959, Recovery of manganese from metallurgical by-products by chlorination. U.S. Pat. No. 2,877,110; reduction-roasting (Rolf, R. F., 1969 in "Selective recovery of manganese and iron from ores". U.S. Pat. No. 3,471,285); sulfation (Freitas, L. R., Amaral, J. C., Mendonga, C. F., 1993. Sulfation of carajas manganese ore with gaseous SO2", Transactions of the Institution of Mining and Metallurgy, Section C—Mineral Processing and Extractive Metallurgy 102, C130-C131); and chlorination, (Cooper, H. S., Schaefer, J. C., Schmidt, E. C., 1959, Recovery of manganese from metallurgical by products by chlorination. U.S. Pat. No. 2,877,110). In all these cases, the final objective is to obtain manganese in a soluble form, mainly as a sulphate.

In regards to leaching, the first process to be carried out may include chemical dissolution, bioleaching, electrolysis, and electrodeposition, among others. In general, the reagent used is acidified ferrous sulphate (Brantley, F. E., Rampacek, C., 1968. Manganese and iron recovery from leach solutions. U.S. Pat. No. 3,397,130); (Das, S. C. Sahoo, P. K. Rao, P. K., 1982. Extraction of manganese from low-grade manganese ores by ferrous sulfate leaching", Hydrometallurgy 8 (1), 35-47).

Also, there are being reported different methods using sulphur dioxide or sulfite solutions (Petrie, L. M., 1995, Molecular interpretation for SO2 dissolution kinetics of pyrolusite. manganite and hematite, Applied Geochemistry 10 (3), 253-267; (Das, S. C. Sahoo, P. K. Rao, P. K., 1982, Extraction of manganese from low-grade manganese ores by ferrous sulfate leaching. Hydrometallurgy 8 (1), 35-47); (Grimanelis, D., Neousyngouna, p., Vazarlis, H., 1992. Leaching of a rich Greek manganese ore by aqueous-solutions of sulfur-dioxide. Hydrometallurgy 31 (1-2), 139-146); (Ravitz, S. F., Wyman, W. F., Back, A. E., Tame, K. E., 1946. The dithionate process for recovery of manganese from low-grade ores. American Institute of Mining Metallurgical Engineers Metals Technology 13 (No. 6, Tech. Pub. No. 2064) 10 pp); (Naik, P. K., Nathsarma, K. C., Das, S. C., V. N. Misra, 2003, Leaching of low-grade Joda manganese ore with sulfur dioxide in aqueous medium. Transactions of the Institutions of Mining and Metallurgy, Section C: Ore Processing and Extractive Metallurgy 112 (2), C131-C134); (Ward, C. B., 2005. "Acidic leaching of manganese from lean oxide ores with extraction stage for purity. WO Patent No. 2005012582); (Maslenitskii, N. N., Mil'ner, R. S., Belikov, V. V. 1969. Laboratory study of dithionate treatment of three samples of low-grade manganese slimes. Obogashchenie Rud (Sankt-Peterburg, Russian Federation) 14 (2), 45); (Sventsitskii, A. T., Nosenkov, A. N., Trunev, S. V., Dmitrevskii, B. A., Treushchenko, N. N., Yur'eva, V. I., Ivanova, N. Y., 2003. Acidic leaching redox of lean manganese ores, slimes, and dust from ferroalloy furnaces. RU Patent No. 2213155); Partenov, D., Stefanova, V., Avramov, a., Chimbulev, M., 2004. Kinetics of leaching of polymetallic concretions in an aqueous solution of SO2. Izvestiya Vysshikh Uchebnykh Zavedenii, Tsvetnaya Metallurgiya (1), 15-19); (Abbruzzese, C., 1987. Aqueous SO2 processing of manganese ores. In: Davies, G. A. (Ed.), Separation Processes in Hydrometallurgy, Society of Chemical Industry. Ellis Horwood Limited, London, pp. (77-87); (Pahlman, J. E., Khalafalla, S. E., 1988, Leaching of domestic manganese ores with dissolved sulfur dioxide. U.S. Bureau of Mines Report of Investigations, Twin Cities, US); (Abbruzzese, C., 1990, in "Percolation leaching of manganese ore by aqueous sulfur dioxide. Hydrometallurgy 25 (1), 85-97). In all these cases, if there is silver associated, it can be released and later be recovered by cyanidation, and it is then when the Mn becomes a byproduct, of industrial interest, but subordinated to the silver higher commercial value.

With regard to manganese ores with occluded silver, where the treatment is focused on the recovery of silver, there are some reports that include an immersion treatment of manganese-argentiferous ore in sulfuric acid-sulphur dioxide, with the removal of impurities using an oxidation method—neutralization {Li Haiyan, Han, y., Liu, k. 1993. A method to produce manganese sulfate and to extract silver. International patent C22B11/08; C22B3/04, CN1993103953 19930407; CN1031413 (C)}.

Simultaneous leaches of manganese and silver have been proposed by using sulfuric acid combined with hydrogen peroxide with good silver recoveries (Jiang, T., Yang, y., Huang, z., Qiu. G. 2003. Simultaneous leaching of manganese and silver from silver-manganese ores at room temperature. Hydrometallurgy 69:177-186 and Jiang, T., Yang, y., Huang, z., Zhang, B., Qiu, g. 2004. Leaching kinetics of pyrolusite from manganese-silver ores in the presence of hydrogen peroxide. Hydrometallurgy 72:129-138). Also, there have been reported silver recoveries by a combination of sulfuric acid and sodium sulfite (see Tian, Q-h, Jiao, C-y., Guo, X-y. 2012. Extraction of valuable metals from silver-manganese ore. Hydrometallurgy 119-120:8-15).

The present invention presents a new and economically attractive methodology for the recovery of silver from manganese-argentiferous ores, using sulphur dioxide as the leaching agent, with silver recovery greater than 85%, and able to be implemented in a silver recovery plant without major modifications.

DETAILED DESCRIPTION OF THE INVENTION

The present invention discloses a treatment method to recover silver from manganese-argentiferous ore with occluded silver, in other words, occluded silver at a microscopic level between the manganese atoms, predominantly pyrolusite, that includes the treatment of the manganese-argentiferous ore with sulphur dioxide ($SO_2$) that in gaseous form is produced by roasting elemental sulfur, generating manganese sulphate solution and an ore residue containing silver, which is leached with sodium cyanide to obtain silver recoveries above 90%.

The ore containing occluded Silver (Ag) and Manganese (Mn), is ground in a conventional ball mill where water is added at the same time. The resulting pulp is classified by particle size in a cyclone to a particle size of 65% to 70% to −200 mesh (74 μm) and a solids percent between 25 and 30%. This pulp is agitated at 450-500 rpm during 3 hours in an agitator tank into which the $SO_2$ gas is injected, produced from the sulfur roasting. During this process, the manganese is dissolved.

The $SO_2$ gas is injected into the ore pulp in order to dissolve the contents of manganese present in the ore, according to the following reactions (See reactions 1 and 2):

$$MnO_2 + SO_2 \rightarrow MnSO_4 \qquad \text{Reaction 1}$$

$$MnO_2 + SO_2 \cdot H_2O \rightarrow MnSO_4 + H_2O \qquad \text{Reaction 2}$$

It is important that during this process, a continuous sampling of the pulp be conducted in order to determine the time at which most of the Mn has been dissolved, taking into account the content of Mn in the ore that has been established in previous quantitative analysis (head analysis).

Once the previous process has been completed, the occluded Ag is released and may be dissolved by using a conventional leaching with sodium cyanide (NaCN).

The next step is to add lime to the ore pulp in order to obtain a pH of 10.5. This results in the precipitation of the Mn and the right conditions are created for the addition of the sodium cyanide (NaCN). The lime consumption is in the order of 135 kg/t of ore. This step uses 1 hour of agitation in the agitator tank at 450 rpm.

Figure 1:
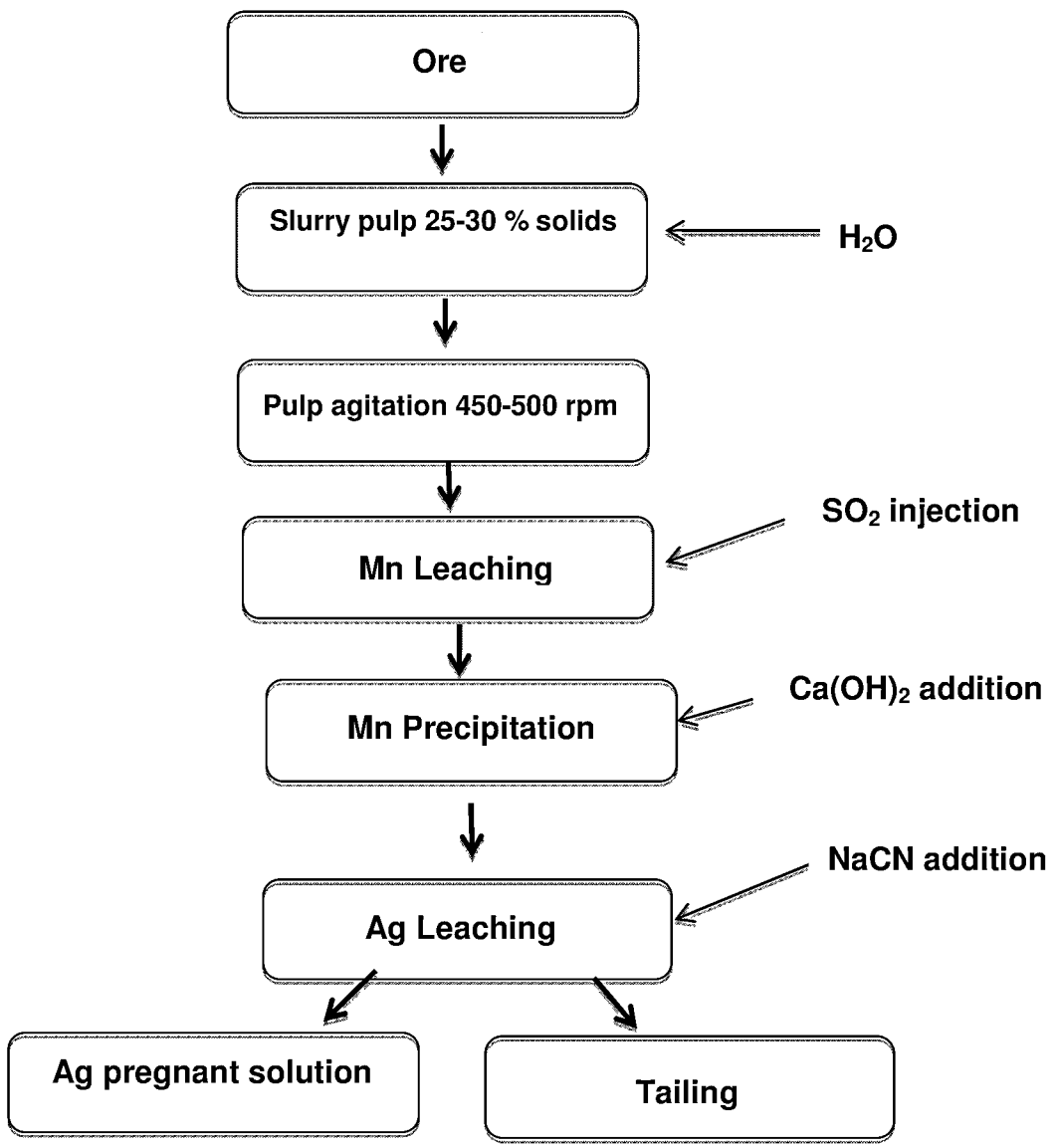
FIG. 1 illustrates a flowchart for the treatment of the manganese-argentiferous ore in accordance to the method of the present invention.

The next step includes the addition of NaCN to the ore pulp, in the form of a solution at a concentration of 0.1% to 0.2%, while maintaining agitation at 450-500 rpm for 18-24 hours. After this time, the pulp is filtered in order to obtain an Ag-rich solution to then go to conventional precipitation process by means of zinc powder (Merrill-Crowe process) and subsequent melting of the precipitate to obtain metallic silver. As shown on the flowchart in FIG. 1, the recovery of silver, by applying the treatment of the present invention, presents the following sequence: Ore-Grinding-Classification—Agitation at 450 rpm—Leaching of the Mn—Precipitating the Mn—Cyanization of the Ag—Obtaining Ag rich solution with contents of 90 ppm.

Example 1

Minerographic Study

Figure 2:
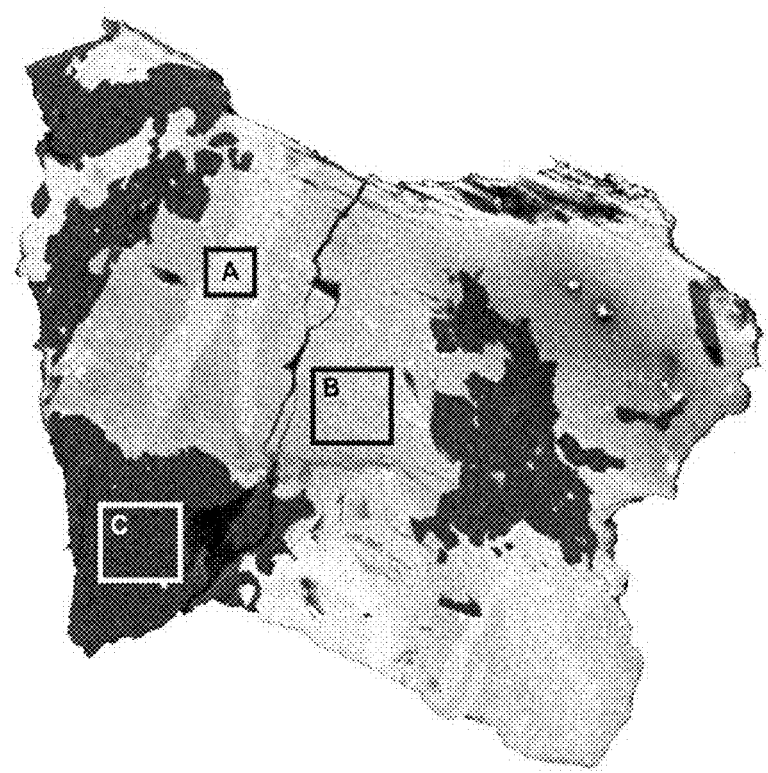
FIG. 2 illustrates an electron microscope scanner micrograph, featuring a particle of the ore sample where test zones A, B and C are being shown.

According to the minerographic study and observations with an electron microscope scanner (FIG. 2), it was determined that the silver is included in the pyrolusite in zones A and B. Area C comprises $SiO_2$ and does not contain silver. The elemental semiquantification of percentages by weight is presented in Table 1.

With the treatment described in this invention, it is possible to recover both the free silver, as well as the silver included in manganese-argentiferous ore.

TABLE 1

| Elemental semiquantification of zones A, B and C (percentages by weight) | | | |
|---|---|---|---|
| Element | Zone A | Zone B | Zone C |
| O | 12.9 | 13.8 | 23.4 |
| Zn | 4.1 | 3.5 | — |
| Al | — | 2.5 | 1.7 |
| Si | — | — | 73.3 |
| Ag | 5.4 | 15.1 | — |
| Mn | 59.1 | 65.1 | 1.6 |
| Pb | 18.5 | — | — |

Example 2

In a conventional ball mill were grinded, 100 kg of manganese-argentiferous ore with a silver content of 259.30 g/t and a Mn content of 5.97% until obtaining a granulometry of 60.73% to −200 mesh (74 μm); the ore pulp is classified by using a cyclone in order to achieve a 30% solids.

The pulp was sent to a mechanical agitator by means of a centrifugal pump.

The agitator tank revolves at 450-500 rpm and it is connected to a sulphur burner, that generates the $SO_2$, and this gas is added to the pulp at a rate of 30 g/min, which causes the leaching of the Mn.

Figure 3:
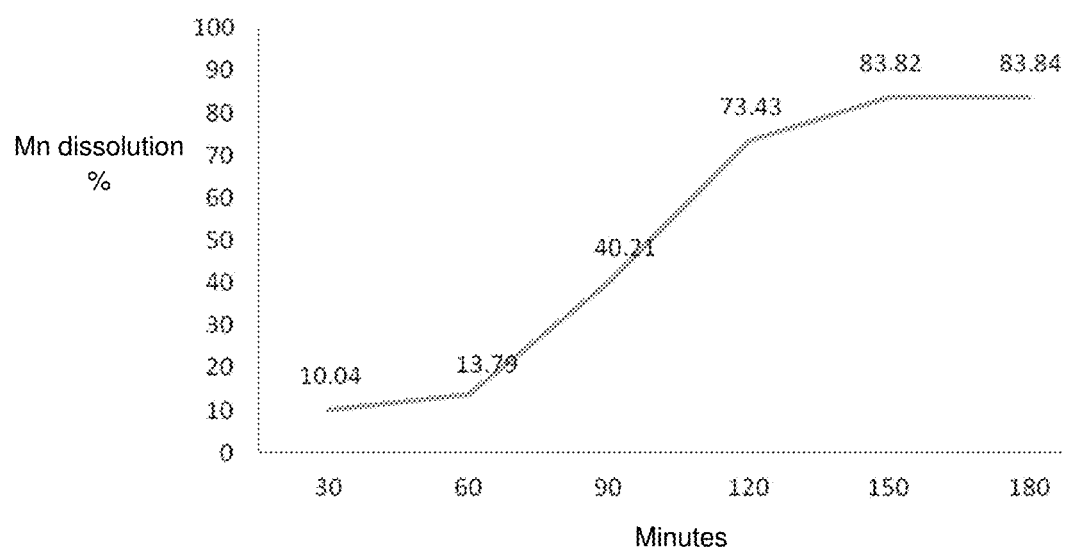
FIG. 3 illustrates a graph that shows the dissolution kinetics of the manganese.

The leaching time of the Mn is 3 hours of continuous agitation, during which sampling and analysis of the solution were done every 30 minutes in order to evaluate the leaching kinetics. In this process was obtained a dissolution of Mn of 83.84%, as can be seen in FIG. 3.

Once the Mn has been dissolved and the Ag has been released, hydrated lime or caustic soda is added until a pH of 10.5 of the pulp is obtained, in order to precipitate the Mn.

This process involves 1 hour of agitation within the same agitator tank.

Subsequently, a solution of sodium cyanide is added to the pulp with a concentration of 0.2% while maintaining agitation for 24 hours. At the end of this period, the pulp is filtered in order to obtain a solution rich in Ag with contents of 89 ppm and a solid residue content of Ag of 34.9 g/t and of Mn of 5.02%.

The Ag-rich solution is precipitated using zinc powder (Merrill Crowe process) and the solid residue is confined at the tailing dam.

Figure 4:
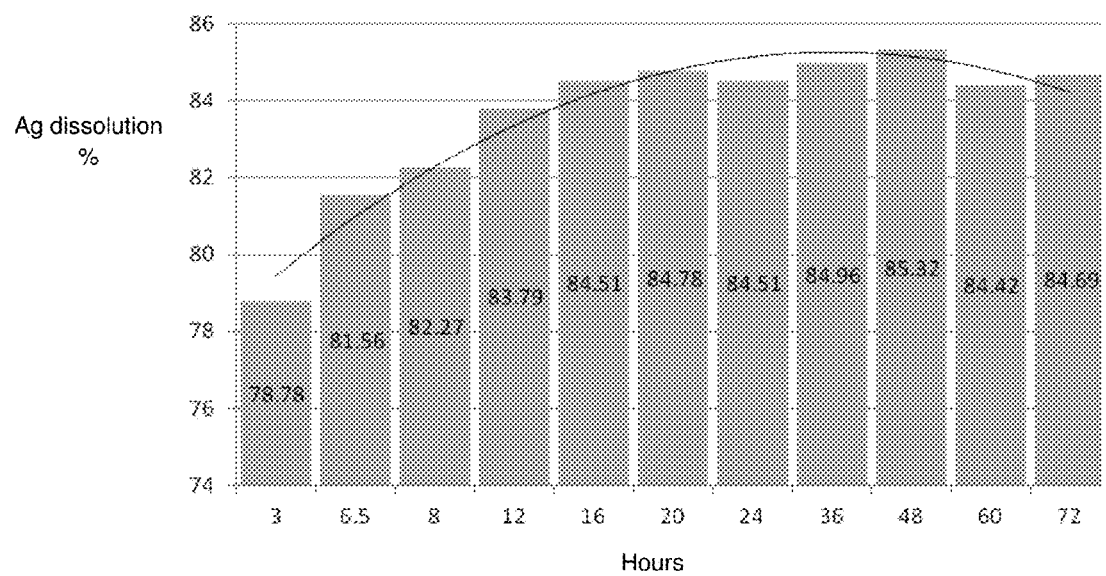
FIG. 4 illustrates a graph that shows the dissolution kinetics of the silver.

A total dissolution of Ag of 84.51% was obtained with consumption of 6 kg sulphur/100 k of ore; lime of 13.5 kg/100 k ore; and cyanide of 384 g/100 kg of ore, with a time of cyanidation of 24 hours, as shown in FIG. 4.

The invention claimed is:

1. A pre-treatment process for a conventional cyanidation for a silver recovery from a manganese-argentiferous ore including occluded silver comprising:
   a) grinding the manganese-argentiferous ore having the occluded silver while simultaneously adding water to obtain a pulp;
   b) classifying the pulp to obtain particles having a particle size of 74 μm and a percentage of solids between 25 and 30%;
   c) agitating the pulp of step b) at 450-500 rpm for 3 hours and at the same time injecting $SO_2$ gas into the pulp of step b) to produce an ore pulp, the $SO_2$ gas is produced by roasting sulfur; and
   d) adding hydrated lime or caustic soda to the ore pulp to obtain a pH of 10.5.

2. The pre-treatment process of claim 1, further including the step of:
   e) precipitating the ore pulp of step d) with zinc powder.

* * * * *